United States Patent [19]

Chung

[11] Patent Number: 5,115,180
[45] Date of Patent: May 19, 1992

[54] AUTOMATIC DRIFT COMPENSATION METHOD AND DEVICE FOR POSITION-LOOP CONTROLLER

[75] Inventor: Ting P. Chung, Hsinchu, Taiwan
[73] Assignee: Microtek International Inc., Taiwan
[21] Appl. No.: 497,411
[22] Filed: Mar. 22, 1990
[51] Int. Cl.⁵ .................................................. G05B 5/01
[52] U.S. Cl. ................................... 318/618; 318/616; 318/610; 318/569
[58] Field of Search .......................... 318/560-646

[56] References Cited

U.S. PATENT DOCUMENTS

| | | | |
|---|---|---|---|
| 3,633,086 | 1/1972 | Speth | 318/649 X |
| 3,917,930 | 11/1975 | Davey et al. | 318/569 X |
| 4,156,169 | 5/1979 | Imamura | 318/616 |
| 4,160,200 | 7/1979 | Imamura et al. | 318/616 |
| 4,485,338 | 11/1984 | Matsuura et al. | 318/569 |
| 4,890,046 | 12/1989 | Kurakake et al. | 318/561 X |

OTHER PUBLICATIONS

Chapter 6-3 of *Computer Control of Manufacturing Systems*, published by McGraw-Hill, Inc., 1983.

*Primary Examiner*—Paul Ip
*Attorney, Agent, or Firm*—Scully, Scott, Murphy & Presser

[57] ABSTRACT

By means of a timer and by setting the compensation for the lag error, the correctness of automatic drift compensation in a position-loop controller is enhanced and the accuracy of position control is also improved. In the present invention, a method and a device for automatic drift compensation in a position-loop controller are disclosed which enable accurate displacement control so as to avoid inadvertent shutdowns of the system.

8 Claims, 3 Drawing Sheets

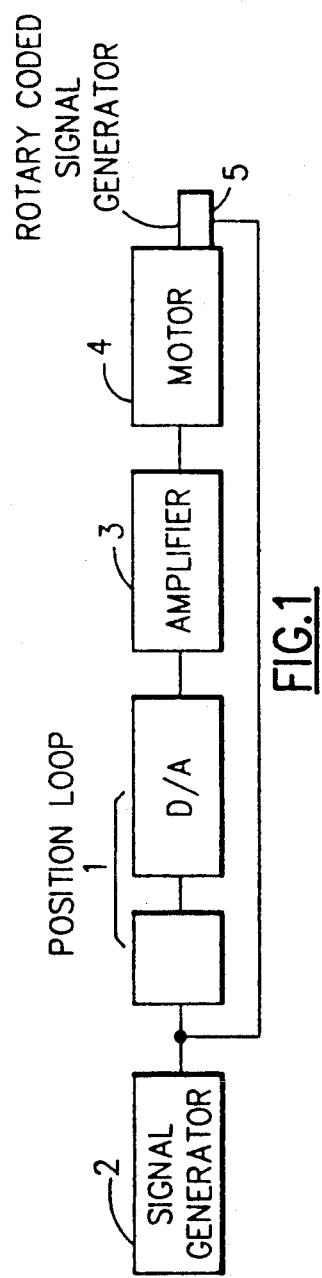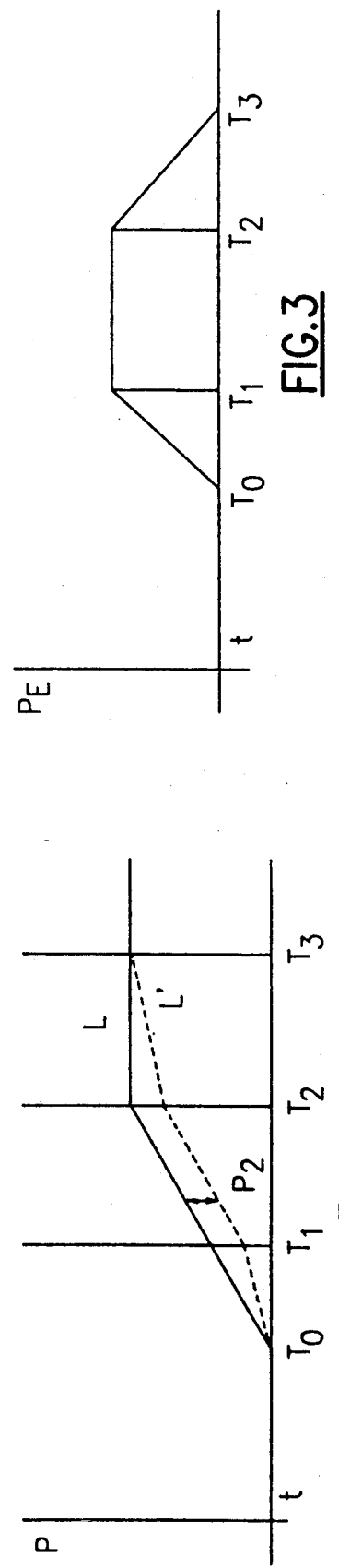

AUTOMATIC DRIFT COMPENSATION METHOD AND DEVICE FOR POSITION-LOOP CONTROLLER

BACKGROUND OF THE INVENTION

The present invention relates to a method and a device capable of automatic drift compensation for a position-loop controller.

FIG. 1 shows a conventional position-loop controller which comprises a position-loop control (1), a signal generator (2), an amplifier (3), a motor (4), and a rotary coded signal generator (5).

In the automatic control process, an instruction is first generated from the position-loop (1), a control signal being sent via the signal generator (2). Said signal, after being amplified by the amplifier (3), is input to the motor (4), causing said motor to rotate. At the same time, position data are fed back to the position-loop by the rotary coded signal generator such that accurate position control can be effected by comparing the feedback signal and the control signal.

FIG. 2 is a diagram showing the relation between the displacement and time during position control in which the X and the Y axes represent the time and the accumulated displacement, respectively. Line L represents the line of instruction displacement and line L', the line of actual displacement.

At time point T0, both the instruction displacement and the actual displacement are 0. When the position instruction is input and the motor starts to rotate, the actual displacement tends to lag behind the instruction displacement due to the electrical and mechanical characteristics as well as the inertia of the motor. For example, when at T1, the instruction displacement should be P1 but the actual displacement is P1'; there will be a lag error of PE. Let the accumulated instruction position be $\Sigma PC$ and the feedback position be $\Sigma PF$, then, the lag error should be:

$$PE = \Sigma PC - \Sigma PF \qquad (1)$$

Upon arriving at time T2, the accumulated instruction position $\Sigma PC$ will reach at P2, then the accumulated feedback position will reach only at $\Sigma PC - PE = P2'$ such that while the signal generator (2) no longer outputs signals, the position-loop does not cause the motor to stop rotating until at T3 when line L' reaching at point P2, then PE should be 0.

FIG. 3 is a diagram showing the relation between PE(drift) and time. AT T0, PE=0 and then increases gradually until reaching a given value at T1, this given value being retained thereafter until at T2 and then decreases gradually to become 0 at T3, meaning that the position movement is accomplished. Then the next step of position control will be taken.

With conventional position-loop controllers, the in-position check is performed by means of the changing characteristics of the PE value, i.e., it is based on that the position control operation is considered as being accomplished when PE is 0.

In such conventional drift compensation methods and devices, the output from the control loop is converted into analog signals by a digital-to-analog converter and then delivered to a servo-driver, which inherently results in drift to be applied to said lag error, causing the control system to shift. In other words, the resulting lag error does not equal the PE mentioned above. If the lag error PE thus obtained is to be used as the basis for said position control, it would be impossible for the system to be reset and hence difficult to make the correct "in-position checks". Consequently, execution of the programs tends to result in errors. To make matter even worse, it would be impossible to obtain the "in-position" decision such that the system would be unable to take the next step of position control, thus causing the machine to stop executing the instructions.

It is frequent with the conventional devices to set a decision value (for example, 10) so as avoid the trouble of machine shutdowns. When the absolute value of the lag error has been compensated to below the set decision value ($E \leq 10$), a decision of "in-position" will be made and the machine will be instructed to take the next step of position control.

While most of the shutdowns can be avoided in this way, the correctness of the control position is significantly decreased. Also, when the lag error is beyond the set decision value (for example, 12) and cannot be reset, the machine will still stop operating.

Therefore, there is an urgent need in the industry for a a method and a device for automatic drift compensation in a position-loop controller which ensures both correct position control and the proper operation of the machine.

SUMMARY OF THE INVENTION

An object of the present invention is to provide a novel method and device capable of automatic drift compensation in a position-loop controller which improve the correctness of position control.

Another object of the present invention is to provide a novel method and device capable of automatic drift compensation in a position-loop controller which perform correct drift compensation so as to avoid machine shutdowns because that reset cannot be effected due to such drift.

BRIEF DESCRIPTION OF THE DRAWINGS

Other objects of the present invention will become more apparent from the following description with reference to the accompanying drawings, in which:

FIG. 1 is a schematic view showing a position-loop controller;

FIG. 2 is a diagram showing the relation between displacement and time during position control;

FIG. 3 is a diagram showing the relation between lag error and time;

DETAILED DESCRIPTION OF THE PREFERRED EMBODIMENTS

A preferred embodiment of the present invention will be described hereinafter with reference to the drawings. It is to be noted that, however, the purpose of the embodiment serves only to illustrate the spirit of the present invention and is not construed as limiting the scope of thereof.

EMBODIMENT

Figure 4:
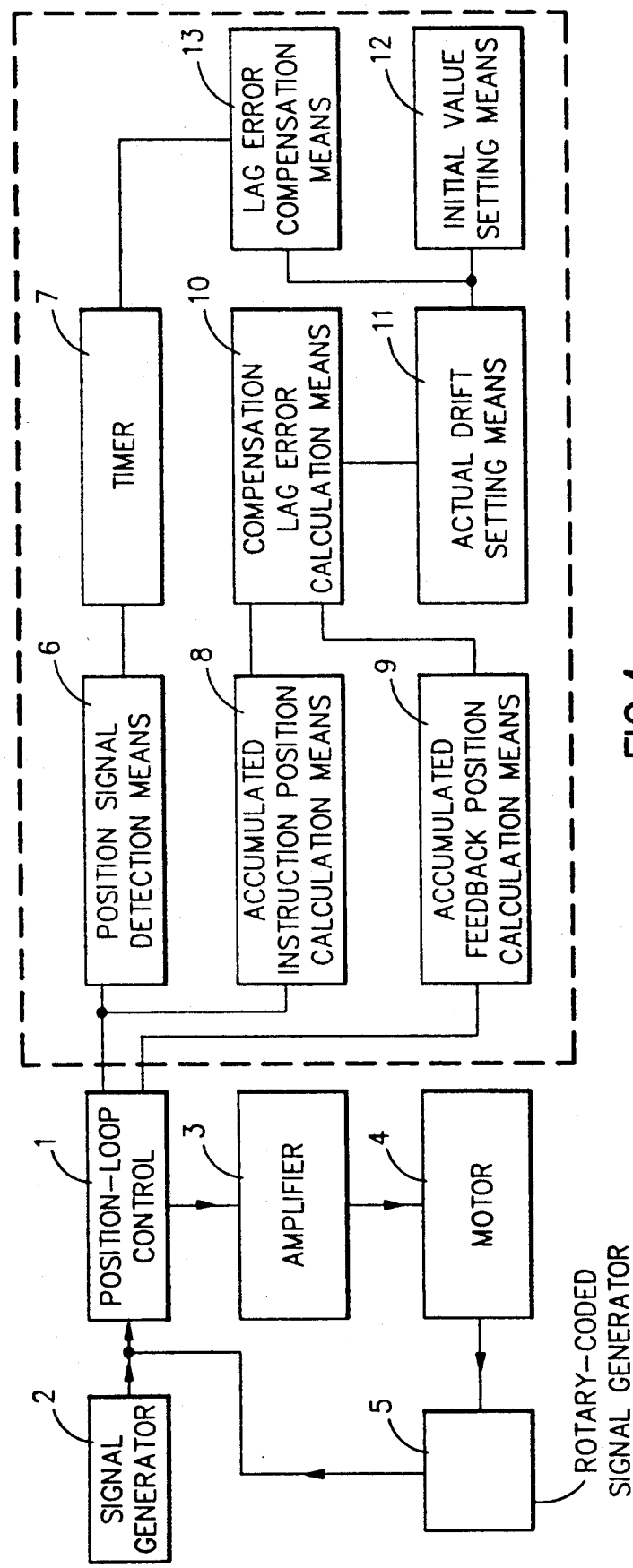
FIG. 4 is a block diagram showing a preferred embodiment of the device for automatic drift compensation in the position-loop controller of the present invention.
Figure 5:
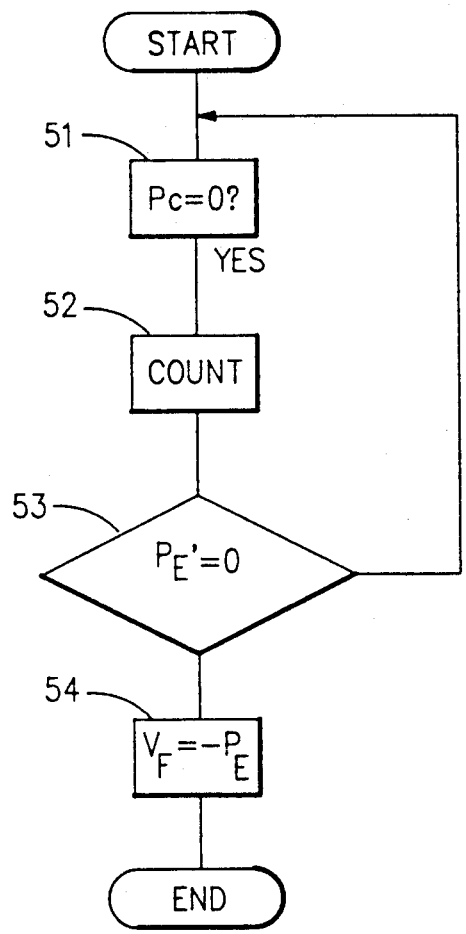
FIG. 5 is a sequence diagram showing a preferred embodiment of the method for automatic drift compensation in the position-loop controller of the present invention.

Referring to the drawings, FIG. 4 is a system diagram showing an embodiment of the present invention and FIG. 5 is the flowchart thereof.

As shown in FIG. 4, the device of the present invention comprises a position-loop control (1), a signal generator (2), an amplifier (3), a motor (4), and feedback means (5) for feeding the signals generated by the rotary coded signal generator back to the position-loop; in addition, position signal detection means (6), a timer (7), accumulated instruction position calculation means (8), accumulated feedback position calculation means (9), and compensation lag error calculation means (10) are also provided such that existing compensation lag error PE' can be calculated from the accumulated instruction position ($\Sigma PC$) output by the accumulated instruction position calculation means (8) and the accumulated feedback position ($\Sigma PF$) output be the accumulated feedback position calculation means (9):

$$PE' = \Sigma PC - \Sigma PF + VF \qquad (2)$$

wherein VF represents the actual drift of the system. In a system suitable for the present embodiment, in-position of the working machine is decided based upon whether PE' is 0 or a given value. (11) represents actual drift setting means; (12), the initial value setting means; and (13), the lag error compensation means.

When the system starts to operate, no actual drift VF should exist and hence VF is set as 0 by the initial value setting means (12). Since the system is always in the process of making in-position checks so as to provide correct position control, now PE' can be calculated to be 0 from VF, and a decision of "in-position" can thus be obtained. When a first instruction PC 1 is generated by the signal generator (2), this instruction will be executed by the position-loop (1) in order to control the rotation of the motor. When the signal generator (2) stops generating the signal PC 1, the timer (7) will be instructed to start timing for a period of, for example, two minutes at step (52) while the position signal of value 0 is detected at step (51) by the position signal detection means (6).

Now, if no actual drift occurs, the value of $\Sigma PF$ will be again equal to that of $\Sigma PC$ at a proper time tF (tF<2 minutes). As a result, the lag error compensation is calculated to be PE'=0 at step (53):

$$PE' = \Sigma PC - \Sigma PF + VF, VF=0 \qquad$$

Therefore, a system which always makes in-position checks will decide if the working machine is in position and thus to execute the next instruction.

When an actual drift does occur, since in formula (2), $\Sigma PC \neq \Sigma PF$ and VF has been set to be 0, hence, PE'$\neq$0. It can been seen, the system now is unable to obtain an in-position decision because of the fact that, in the system suitable for the present embodiment, in-position of the working machine is decided based upon whether PE' is 0 or a given value.

After, for example, two minutes, it can be decided that the machine must have been in position, but since PE' fails to become 0 or a given value, it can be sure that actual drift has still occurred, thus the lag error compensation means (13) is caused to renew the value of PE' at step (54). In the present embodiment, the current lag error value PE is taken:

$$PE = \Sigma PC - \Sigma PF \qquad (2)$$

the value of the actual VF is set at the actual drift setting means (11)

$$VF = -PE \qquad (3)$$

now, PE' can be known from formula (2):

$$\begin{aligned} PE' &= \Sigma PC - \Sigma PF + VF \\ &= PE + (-PE) \\ &= 0 \end{aligned}$$

then the compensation lag error becomes 0, and the control system can decide that the working machine is in position, thus causing the position-loop to deliver the next instruction for the machine to take the next move.

In the above manner, the position-loop can accurately detect the in-position of the machine and obtain the correct lag error so as to serve the purposes for preventing machine shutdowns and for correct control.

While a preferred embodiment of the present invention has been described, various changes and modifications can be made by those skilled in the art according to the spirit of the present invention. It is intended that such changes and modifications are covered in the scope thereof.

I claim:

1. An automatic drift compensation device for a position-loop controller that generates position instruction signals to control displacement of a working machine, the compensating device comprising:

instruction detection means to detect the position instruction signals;

a timer;

timer control means to start the timer for a predetermined period in response to the detection of a predetermined position instruction signal by the instruction detection means;

accumulated instruction calculating means for calculating an accumulated instruction position value, $\Sigma PC$, from the position instruction signals;

feedback means to generate feedback signals in response to actual displacement of the working machine, and to transmit said feedback signals to the position-loop controller;

accumulated feedback position calculating means for calculating an accumulated feedback position value, $\Sigma PF$, from the feedback signals;

compensation lag error setting means for setting a compensation lag error value, PE', by means of a first formula: PE'=$\Sigma PC - \Sigma PF$+vF, wherein vF represents actual drift of the position-loop controller;

lag error calculating means for calculating a current lag error value, PE, in response to the timer control means starting the timer, and according to a second formula: PE=$\Sigma PC - \Sigma PF$;

reset detection means for detecting the value of PE', and for generating an arrive signal when the value of PE' is less than or equal to a given value; and compensation lag error resetting means for receiving the arrive signal from the reset detection means and for resetting the compensation lag error value at the end of said predetermined period if no arrive signal has been received from the reset detection means during the predetermined period;

wherein after the compensation lag error resetting means resets the compensation lag error value, the lag error calculating means resets the lag error value, PE, according to a third formula: PE = −vF.

2. A drift compensation device according to claim 1, wherein said given value is zero.

3. A drift compensation device according to claim 1, wherein said predetermined period is less than or equal to two minutes.

4. A drift compensation device according to claim 1, wherein said predetermined period is less than or equal to one minute.

5. A drift compensation method for a position-loop controller that generates position instruction signals to control displacement of a working machine, the method comprising:

calculating an accumulated instruction position value, ΣPC, from the position instruction signals;

generating a feedback signal in response to actual displacement of the working machine;

calculating an accumulated feedback position value, ΣPF, from the feedback signals;

setting a compensation lag error value, PE', by means of a first formula: PE' = ΣPC − ΣPF + vF, wherein vF represents actual drift of the position-loop controller;

detecting the position instruction signals;

starting a timer for a predetermined period in response to the detection of a predetermined position instruction signal;

calculating a current lag error value, PE, in response to starting the timer for the predetermined period, and according to a second formula: PE = ΣPC − ΣPF;

comparing the compensation lag error value with a given value, and generating an arrive signal when the compensation lag error value is less than or equal to said given value;

resetting the compensation lag error value at the end of said predetermined period if no arrive signal has been generated during said predetermined period; and after the step of resetting the compensation lag error value, resetting the lag error value, PE, according to a third formula: PE = −vF.

6. A method according to claim 5, wherein said given value is zero.

7. A method according to claim 5, wherein said predetermined period is less than or equal to two minutes.

8. A method according to claim 5, wherein said predetermined period is less than or equal to one minute.

* * * * *